(12) United States Patent
Schindel et al.

(10) Patent No.: US 12,093,374 B1
(45) Date of Patent: *Sep. 17, 2024

(54) CYBERSECURITY INCIDENT RESPONSE TECHNIQUES UTILIZING ARTIFICIAL INTELLIGENCE

(71) Applicant: Wiz, Inc., New York, NY (US)

(72) Inventors: Alon Schindel, Tel Aviv (IL); Barak Sharoni, Tel Aviv (IL); Amitai Cohen, Kfar Saba (IL); Ami Luttwak, Binyamina (IL); Roy Reznik, Tel Aviv (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,532

(22) Filed: Apr. 29, 2024

Related U.S. Application Data

(63) Continuation of application No. 18/428,794, filed on Jan. 31, 2024, now Pat. No. 12,001,549, which is a continuation of application No. 18/466,882, filed on Sep. 14, 2023, now Pat. No. 12,001,550, which is a continuation-in-part of application No. 18/457,054, filed on Aug. 28, 2023.

(51) Int. Cl.
*G06F 21/55* (2013.01)
*G06F 16/2452* (2019.01)

(52) U.S. Cl.
CPC ...... *G06F 21/552* (2013.01); *G06F 16/24522* (2019.01)

(58) Field of Classification Search
CPC .............. G06F 21/552; G06F 16/24522
See application file for complete search history.

(56) References Cited

U.S. PATENT DOCUMENTS

| | | | |
|---|---|---|---|
| 8,645,122 B1 | 2/2014 | Di Fabbrizio et al. | |
| 10,158,677 B1 | 12/2018 | DiCorpo et al. | |
| 10,417,346 B2 | 9/2019 | Kim et al. | |
| 11,301,502 B1 | 4/2022 | Dijamco et al. | |
| 11,544,282 B1 * | 1/2023 | Chor | G06F 9/451 |
| 11,544,343 B1 * | 1/2023 | Bhushan | G06T 11/001 |
| 11,551,421 B1 * | 1/2023 | Bhushan | G06T 19/20 |
| 11,563,813 B1 * | 1/2023 | Bhushan | G06F 16/213 |
| 11,574,429 B1 * | 2/2023 | Tam | G06F 40/106 |
| 11,579,764 B1 * | 2/2023 | Argroves | G06F 11/3409 |
| 11,593,669 B1 * | 2/2023 | Chhabra | G06F 11/301 |
| 11,601,324 B1 * | 3/2023 | Fletcher | G06F 11/0709 |
| 11,604,877 B1 * | 3/2023 | Gallien | H04L 63/1441 |
| 11,620,541 B1 * | 4/2023 | Ghosh | G06N 5/04 707/600 |
| 11,630,695 B1 * | 4/2023 | Aleti | G06F 16/24549 707/741 |

(Continued)

*Primary Examiner* — Stephen T Gundry
(74) *Attorney, Agent, or Firm* — M&B IP Analysts, LLC

(57) ABSTRACT

A system and method for providing cybersecurity incident response utilizing a large language model. The method includes: mapping a received incident input into a scenario of a plurality of scenarios, each scenario including a plurality of sub-scenarios; generating a query based on the received incident input and a selection of a sub-scenario of the plurality of sub-scenarios; executing the query on a security database, the security database including a representation of the computing environment; and initiating a mitigation action based on a result of the executed query.

19 Claims, 7 Drawing Sheets

(56) References Cited

U.S. PATENT DOCUMENTS

| | | | |
|---|---|---|---|
| 11,644,940 B1 * | 5/2023 | Chor | G06F 3/011 |
| | | | 715/782 |
| 11,651,571 B1 * | 5/2023 | Bhushan | G06T 15/04 |
| | | | 345/633 |
| 11,663,109 B1 * | 5/2023 | Deaderick | G06F 11/3006 |
| | | | 702/179 |
| 11,663,382 B1 | 5/2023 | Cascioli | |
| 11,670,062 B1 | 6/2023 | Bhushan et al. | |
| 11,670,288 B1 | 6/2023 | Das et al. | |
| 11,675,473 B1 | 6/2023 | Breeden et al. | |
| 11,675,816 B1 | 6/2023 | Chandrasekharan et al. | |
| 11,676,072 B1 | 6/2023 | Chandrasekharan et al. | |
| 11,676,345 B1 | 6/2023 | Bhushan et al. | |
| 11,687,413 B1 | 6/2023 | Chen et al. | |
| 11,693,710 B1 | 7/2023 | Aleti et al. | |
| 11,704,219 B1 | 7/2023 | Lerner et al. | |
| 11,714,683 B1 | 8/2023 | Roberts et al. | |
| 11,720,686 B1 | 8/2023 | Cross et al. | |
| 11,727,643 B1 | 8/2023 | Bhushan et al. | |
| 11,729,074 B1 | 8/2023 | Mishra et al. | |
| 11,734,886 B1 | 8/2023 | Bhushan et al. | |
| 11,741,131 B1 | 8/2023 | Dwivedi et al. | |
| 11,755,405 B1 | 9/2023 | Satish et al. | |
| 11,762,869 B1 | 9/2023 | Werner | |
| 11,809,497 B2 * | 11/2023 | Beringer | G06F 16/9038 |
| 11,860,914 B1 | 1/2024 | Qadrud-Din et al. | |
| 11,861,320 B1 | 1/2024 | Gajek et al. | |
| 11,861,321 B1 | 1/2024 | O'Kelly et al. | |
| 11,928,569 B1 | 3/2024 | Douthit | |
| 2008/0091681 A1 | 4/2008 | Dwivedi et al. | |
| 2013/0018920 A1 | 1/2013 | Griffin | |
| 2014/0095469 A1 | 4/2014 | Chen et al. | |
| 2018/0062916 A1 | 3/2018 | Eda et al. | |
| 2020/0244700 A1 | 7/2020 | Moon et al. | |
| 2020/0349919 A1 | 11/2020 | Wanas et al. | |
| 2022/0229832 A1 | 7/2022 | Li et al. | |
| 2022/0382752 A1 | 12/2022 | Yadav et al. | |
| 2023/0018809 A1 * | 1/2023 | Deshmukh | H04L 63/20 |
| 2023/0061234 A1 | 3/2023 | Calado et al. | |
| 2023/0088034 A1 * | 3/2023 | Salman | H04L 63/205 |
| | | | 726/1 |
| 2023/0139000 A1 * | 5/2023 | Apger | H04L 63/1416 |
| | | | 726/1 |
| 2023/0140918 A1 * | 5/2023 | Saxena | G06Q 10/0635 |
| | | | 705/7.27 |
| 2023/0142344 A1 * | 5/2023 | Nakar | G06F 21/6218 |
| | | | 726/26 |
| 2023/0161821 A1 * | 5/2023 | Beringer | G06F 16/904 |
| | | | 707/722 |
| 2023/0164098 A1 * | 5/2023 | Cai | G06N 20/00 |
| | | | 709/206 |
| 2023/0222029 A1 | 7/2023 | Vutukuru et al. | |
| 2023/0224324 A1 | 7/2023 | Karabey et al. | |
| 2023/0224377 A1 | 7/2023 | Bathla et al. | |
| 2023/0252140 A1 | 8/2023 | Coulter | |
| 2023/0274086 A1 | 8/2023 | Tunstall-Pedoe et al. | |
| 2023/0274094 A1 | 8/2023 | Tunstall-Pedoe et al. | |
| 2023/0316001 A1 | 10/2023 | Araki | |
| 2023/0319074 A1 | 10/2023 | Murphy et al. | |
| 2023/0319097 A1 | 10/2023 | Murphy et al. | |
| 2023/0325725 A1 | 10/2023 | Lester et al. | |
| 2023/0351026 A1 | 11/2023 | Cross et al. | |
| 2024/0020538 A1 | 1/2024 | Socher et al. | |
| 2024/0062016 A1 | 2/2024 | Tong et al. | |

* cited by examiner

CYBERSECURITY INCIDENT RESPONSE TECHNIQUES UTILIZING ARTIFICIAL INTELLIGENCE

CROSS-REFERENCE TO RELATED APPLICATIONS

This application is a continuation of U.S. patent application Ser. No. 18/428,794 filed Jan. 31, 2024, which is a continuation of U.S. patent application Ser. No. 18/466,882 filed Sep. 14, 2023, which itself is a continuation-in-part of U.S. patent application Ser. No. 18/457,054 filed on Aug. 28, 2023, all contents of which are hereby incorporated by reference.

TECHNICAL FIELD

The present disclosure relates generally to cybersecurity incident response and specifically to initiating mitigation actions in response to detected cybersecurity threats.

BACKGROUND

Computer systems generate increasingly more data. As more and more data is generated, solutions arise to problems relating to storing, accessing, deleting, and managing this data.

One method of organizing and storing data is referred to as structured data storage. Structured data is implemented where data is structured, e.g., using a data schema, data model, and the like, and a persistent order to the data is realized.

Structured data solutions are extremely useful for computer systems, however, such solutions are not always human-friendly. In other words, a data structure, such as a SQL database, makes it easier for a machine to store data, retrieve data, manage data, etc., but requires a human to learn a special query language which the machine uses to retrieve and store data, for example.

Humans tend to converse in natural language, which does not have the rigid structure of machine languages. Increasingly, natural language processing techniques allow users to generate statements, queries, and the like, which a machine translates to a computer language, and executes on an appropriate data set.

A recurring issue with such processes is a lack of context, and a reliance on statistics of what other users search for. For example, for the natural language query "what is jay?", a computer has no way of discerning between the English letter "J", the given name "Jay", and a commonly used name of a North American bird species, just to give a few examples.

As such, specifically for cybersecurity solutions, an operator will often receive an alert that lacks context and information which is presented in a manner which is machine readable but does not immediately convey context, does not provide a root cause, or indicate what, if at all, should be done to remediate, mitigate, and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include mapping a received incident input into a scenario of a plurality of scenarios, each scenario including a plurality of sub-scenarios. Method may also include generating a query based on the received incident input and a selection of a sub-scenario of the plurality of sub-scenarios. Method may furthermore include executing the query on a security database, the security database including a representation of a computing environment; and initiating a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. Method where the incident input includes any one of: a query, a statement, and a combination thereof. Method may include: providing the received incident input into a large language model (LLM); and mapping the incident input into the scenario based on an output of the LLM. Method where the LLM is trained on: a data schema utilized in representing the computing environment, incident data classified to a scenario, the plurality of scenarios, and any combination thereof. Method may include: generating the query further using the LLM. Method may include: training the LLM on a plurality of database queries, each database query executable on the security database. Method may include: receiving a user input through a user interface, the user interface configured to render a graphical representation of a group of subs-scenarios of the plurality of sub-scenarios; selecting the sub-scenario further based on the received user input. Method may include: generating a prompt for the LLM based on the received user input, the prompt, when executed configuring the LLM to output a sub-scenario selection. Method may include: receiving an user input through a component of a graphical user interface to initiate generation of an explanation of a security finding; utilizing the LLM to generate an explanation of a security finding, the explanation including any one of: a base observation regarding the security finding, an analysis of a symptomatic nature of the security finding, and a combination thereof; and rendering for display the generated explanation of the security finding. Method may include: processing a user input through a component of a graphical user interface to initiate investigation of a custom incident; and generating a request to receive additional contextual information where the custom incident is unrelated to any specific resource. Implementations of the described techniques may include hardware, a method or process, or a computer tangible medium.

In one general aspect, non-transitory computer-readable medium may include one or more instructions that, when executed by one or more processors of a device, cause the device to: map a received incident input into a scenario of a plurality of scenarios, each scenario including a plurality of sub-scenarios; generate a query based on the received incident input and a selection of a sub-scenario of the plurality of sub-scenarios; execute the query on a security database, the security database including a representation of a computing environment; and initiate a mitigation action based on a result of the executed query. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: map a received incident input into a scenario of a plurality of scenarios, each scenario including a plurality of sub-scenarios. System may in addition generate a query based on the received incident input and a selection of a sub-scenario of the plurality of sub-scenarios. System may moreover execute the query on a security database, the security database including a representation of a computing environment. System may also initiate a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. System where the incident input includes any one of: a query, a statement, and a combination thereof. System where the memory contains further instructions which when executed by the processing circuitry further configure the system to: provide the received incident input into a large language model (LLM); and map the incident input into the scenario based on an output of the LLM. System where the LLM is trained on: a data schema utilized in representing the computing environment, incident data classified to a scenario, the plurality of scenarios, and any combination thereof. System where the memory contains further instructions which when executed by the processing circuitry further configure the system to: generate the query further using the LLM. System where the memory contains further instructions which when executed by the processing circuitry further configure the system to: train the LLM on a plurality of database queries, each database query executable on the security database. System where the memory contains further instructions which when executed by the processing circuitry further configure the system to: receive a user input through a user interface, the user interface configured to render a graphical representation of a group of subs-scenarios of the plurality of sub-scenarios; and select the sub-scenario further based on the received user input. System where the memory contains further instructions which when executed by the processing circuitry further configure the system to: generate a prompt for the LLM based on the received user input, the prompt, when executed configuring the LLM to output a sub-scenario selection. System where the memory contains further instructions which when executed by the processing circuitry further configure the system to: receive an user input through a component of a graphical user interface to initiate generation of an explanation of a security finding; utilize the LLM to generate an explanation of a security finding, the explanation including any one of: a base observation regard the security finding, an analysis of a symptomatic nature of the security finding, and a combination thereof; and render for display the generated explanation of the security finding. System where the memory contains further instructions which when executed by the processing circuitry further configure the system to: process a user input through a component of a graphical user interface to initiate investigation of a custom incident; and generate a request to receive additional contextual information where the custom incident is unrelated to any specific resource. Implementations of the described techniques may include hardware, a method or process, or a computer tangible medium.

In one general aspect, method may include receiving an incident input based on a cybersecurity event. Method may also include generating a prompt for a large language model (LLM) based on the received incident input. Method may furthermore include configuring the LLM to generate an output based on the generated prompt. Method may in addition include mapping the received incident input into a scenario of a plurality of scenarios based on the output of the LLM, where each scenario is associated with an incidence response. Method may moreover include generating a query based on the received incident input and the mapped scenario. Method may also include executing the query on a security database, the security database including a representation of a computing environment; and initiating a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. Method where the incident input includes any one of: a query, a statement, and a combination thereof. Method where the LLM is trained on any one of: a data schema utilized in representing the computing environment, incident data classified to a scenario, the plurality of scenarios, and a combination thereof. Method where generating the query further comprises: generating a second prompt for the LLM which when executed by the LLM outputs the query, where the second prompt is generated based on any one of: the received incident input, the data schema, the plurality of scenarios, and a combination thereof. Method may include: training the LLM further on a plurality of database queries, each database query executable on the security database. Method may include: receiving an user input through an user interface, the user interface configured to render a graphical representation of the plurality of scenarios; selecting a sub-scenario of a scenario of the plurality of scenarios based on the received user input. Method may include: generating a prompt for the LLM based on the received user input, the prompt, when executed configuring the LLM to output a sub-scenario selection. Method may include: processing an user input through a component of a graphical user interface to initiate investigation of a custom incident; and generating a request to receive additional contextual information where the custom incident is unrelated to any specific resource. Method may include: traversing the security database to detect a cybersecurity finding, the finding associated with a resource, the resource associated with an incident of the incident response. Method may include: receiving an user input through a component of a graphical user interface to initiate generation of an explanation of the security finding; utilizing the LLM to generate an explanation of the security finding, the explanation including any one of: a base observation regarding the security finding, an analysis of a symptomatic nature of the security finding, and a combination thereof; and rendering for display the generated explanation of the security finding. Implementations of the described techniques may include hardware, a method or process, or a computer tangible medium.

In one general aspect, non-transitory computer-readable medium may include one or more instructions that, when executed by one or more processors of a device, cause the device to: receive an incident input based on a cybersecurity event; generate a prompt for a large language model (LLM) based on the received incident input; configure the LLM to generate an output based on the generated prompt; map the received incident input into a scenario of a plurality of scenarios based on the output of the LLM, where each scenario is associated with an incidence response; generate a query based on the received incident input and the mapped scenario; execute the query on a security database, the security database including a representation of a computing environment; and initiate a mitigation action based on a result of the executed query. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive an incident input based on a cybersecurity event. System may in addition generate a prompt for a large language model (LLM) based on the received incident input. System may moreover configure the LLM to generate an output based on the generated prompt. System may also map the received incident input into a scenario of a plurality of scenarios based on the output of the LLM, where each scenario is associated with an incidence response. System may furthermore generate a query based on the received incident input and the mapped scenario. System may in addition execute the query on a security database, the security database including a representation of a computing environment. System may moreover initiate a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. System where the incident input includes any one of: a query, a statement, and a combination thereof. System where the LLM is trained on any one of: a data schema utilized in representing the computing environment, incident data classified to a scenario, the plurality of scenarios, and a combination thereof. System where the memory contains further instructions that, when executed by the processing circuitry for generating the query, further configure the system to: generate a second prompt for the LLM which when executed by the LLM outputs the query, where the second prompt is generated based on any one of: the received incident input, the data schema, the plurality of scenarios, and a combination thereof. System where the memory contains further instructions which when executed by the processing circuitry further configure the system to: train the LLM further on a plurality of database queries, each database query executable on the security database. System where the memory contains further instructions which when executed by the processing circuitry further configure the system to: receive an user input through an user interface, the user interface configured to render a graphical representation of the plurality of scenarios; and select a sub-scenario of a scenario of the plurality of scenarios based on the received user input. System where the memory contains further instructions which when executed by the processing circuitry further configure the system to: generate a prompt for the LLM based on the received user input, the prompt, when executed configuring the LLM to output a sub-scenario selection. System where the memory contains further instructions which when executed by the processing circuitry further configure the system to: process an user input through a component of a graphical user interface to initiate investigation of a custom incident; and generate a request to receive additional contextual information where the custom incident is unrelated to any specific resource. System where the memory contains further instructions which when executed by the processing circuitry further configure the system to: traverse the security database to detect a cybersecurity finding, the finding associated with a resource, the resource associated with an incident of the incident response. System where the memory contains further instructions which when executed by the processing circuitry further configure the system to: receive an user input through a component of a graphical user interface to initiate generation of an explanation of the security finding; utilize the LLM to generate an explanation of the security finding, the explanation including any one of: a base observation regard the security finding, an analysis of a symptomatic nature of the security finding, and a combination thereof; and render for display the generated explanation of the security finding. Implementations of the described techniques may include hardware, a method or process, or a computer tangible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving an incident input based on an event in a computing environment. Method may also include generating a prompt for a large language model (LLM) based on the received incident input. Method may furthermore include utilizing the LLM to generate an output based on the generated prompt. Method may in addition include utilizing the LLM to map the received incident input into a scenario of a plurality of scenarios based on the output of the LLM, where each scenario is associated with an incidence response. Method may moreover include generating a query based on the received incident input and the mapped scenario. Method may also include executing the query on a security database, the security database including a representation of the computing environment; and initiating a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. Method may include: detecting an identifier of a resource in the result of the executed query; and initiating the mitigation action on the resource. Method may include: detecting an identifier of a cybersecurity threat in the result of the executed query, the cybersecurity threat represented by a representation in the security database; and detecting in the security database a representation of a remediation action connected to the representation of the cybersecurity threat. Method may include: initiating the remediation action in the computing environment. Method where the mitigation action includes any one of: generating a notification, generating an alert, updating an alert, generating a severity score, updating a severity score, generating a ticket, generating a risk score, updating a risk score, initiating a remediation action, initiating an incident response, and any combination thereof. Method where the incident input includes any one of: a query, a statement, and a combination thereof. Method may include: training the LLM on any one of: a data schema utilized in representing the computing environment, an incident data classified to a scenario, the plurality of scenarios, and any combination thereof. Method where generating the query further comprises: generating a second prompt based on any one of: the received incident input, the data schema, the plurality of scenarios, and a combination thereof; and utilizing the LLM with the second prompt to output the query. Method may include: training the LLM further on a plurality of database queries, each database query executable on the security database. Implementations of the described techniques may include hardware, a method or process, or a computer tangible medium.

In one general aspect, non-transitory computer-readable medium may include one or more instructions that, when executed by one or more processors of a device, cause the device to: receive an incident input based on an event in a computing environment; generate a prompt for a large language model (LLM) based on the received incident input; utilize the LLM to generate an output based on the generated prompt; utilize the LLM to map the received incident input into a scenario of a plurality of scenarios based on the output of the LLM, where each scenario is associated with an incidence response; generate a query based on the received incident input and the mapped scenario; execute the query on a security database, the security database including a representation of the computing environment; and initiate a mitigation action based on a result of the executed query. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive an incident input based on an event in a computing environment. System may in addition generate a prompt for a large language model (LLM) based on the received incident input. System may moreover utilize the LLM to generate an output based on the generated prompt. System may also utilize the LLM to map the received incident input into a scenario of a plurality of scenarios based on the output of the LLM, where each scenario is associated with an incidence response. System may furthermore generate a query based on the received incident input and the mapped scenario. System may in addition execute the query on a security database, the security database including a representation of the computing environment. System may moreover initiate a mitigation action based on a result of the executed query. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect an identifier of a resource in the result of the executed query; and initiate the mitigation action on the resource. System where the memory contains further instructions which when executed by the processing circuitry further configure the system to: detect an identifier of a cybersecurity threat in the result of the executed query, the cybersecurity threat represented by a representation in the security database; and detect in the security database a representation of a remediation action connected to the representation of the cybersecurity threat. System where the memory contains further instructions which when executed by the processing circuitry further configure the system to: initiate the remediation action in the computing environment. System where the mitigation action includes any one of: generating a notification, generating an alert, updating an alert, generating a severity score, updating a severity score, generating a ticket, generating a risk score, updating a risk score, initiating a remediation action, initiating an incident response, and any combination thereof. System where the incident input includes any one of: a query, a statement, and a combination thereof. System where the memory contains further instructions which when executed by the processing circuitry further configure the system to: train the LLM on any one of: a data schema utilized in representing the computing environment, an incident data classified to a scenario, the plurality of scenarios, and any combination thereof. System where the memory contains further instructions that, when executed by the processing circuitry for generating the query, further configure the system to: generate a second prompt based on any one of: the received incident input, the data schema, the plurality of scenarios, and a combination thereof; and utilize the LLM with the second prompt to output the query. System where the memory contains further instructions which when executed by the processing circuitry further configure the system to: train the LLM further on a plurality of database queries, each database query executable on the security database. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
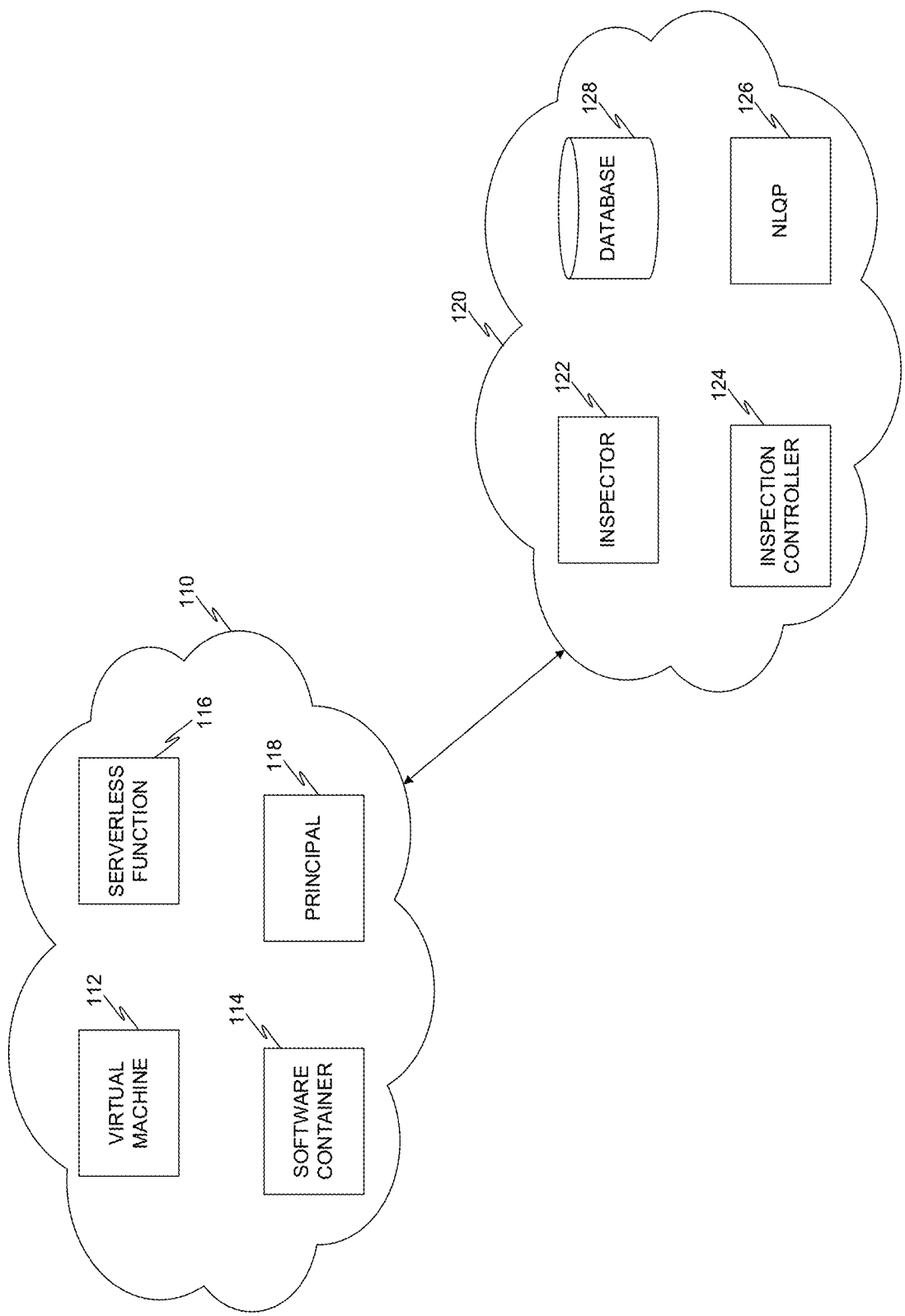
FIG. 1 is an example schematic diagram of a computing environment communicatively coupled with a cybersecurity inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing cybersecurity incident response. Cybersecurity systems are complex both in terms of the computing environments which they monitor, and in terms of objects which they monitor for, such cybersecurity threats, vulnerabilities, exposures, misconfigurations, combinations thereof, and the like.

Often times, a vulnerability (or other threat) may become known to an operator of a cybersecurity system, without the operator knowing which of the workloads in their computing environment might be affected. A prominent example of this is the SolarWinds® attack in 2019-2020, during which attackers gained access to multiple different computing environments, all having in common a SolarWinds network monitoring software.

According to an embodiment, a natural language query processor is utilized to provide a system for cybersecurity incident response, for example as a software wizard. In an embodiment, a natural language query, an unstructured query, an alert, a combination thereof, and the like, are provided to a natural language query processor (NLQP) as an incident input.

In an embodiment, the NLQP is configured to receive the incident input and select a scenario. In some embodiments, the scenario is selected from a plurality of scenarios. In an embodiment, at least a scenario of the plurality of scenarios is a predefined scenario. In some embodiments, a scenario is generated by a neural network, as discussed below. In an embodiment, each scenario corresponds to a cybersecurity situation.

For example, a cybersecurity situation is, according to an embodiment, a workload having a malware, a workload generating network traffic with a prohibited domain, combinations thereof, and the like. In some embodiments, a scenario includes a plurality of sub-scenarios. In an embodiment, the cybersecurity situation includes a cybersecurity risk, such as a workload with an exposed database, a workload connected to a public network (e.g., the Internet), combinations thereof, and the like.

As another example, a sub-scenario includes a prompt, a question, a security finding, a combination thereof, and the like. In an embodiment, where the scenario is a workload with malware, a sub-scenario corresponds to a question, a prompt, and the like, for example: how was the workload infected, what lateral movement can an attacker perform from the workload, what other workloads are at risk, what is the impact of a specific workload being compromised, etc.

In certain embodiments, the NLQP is configured to generate a database query based on any one of: the scenario, the sub-scenario, the incident input, a combination thereof, and the like.

In some embodiments, sub-scenarios are received continuously. In an embodiment, a second sub-scenario selection is performed based on a result of a database query executed based on a first sub-scenario selection. For example, in an embodiment, a first sub-scenario includes a database query corresponding to a question "how was the workload infected". A result is received in response to executing the database query. In an embodiment, the result includes a network path between the workload and a public network, including a load balancer, a firewall, and a gateway. In an embodiment, a second sub-scenario is selected based on the result (e.g., the network path), to generate a database query corresponding to "are additional workloads compromised". Such a database query, when executed, returns a result which corresponds to the status of each workload in the network path, to determine if such workloads are also compromised. In an embodiment, the second sub-scenario includes generating an instruction which, when executed, initiates inspection for a cybersecurity object, a vulnerability, an exposure, a misconfiguration, a malware, a combination thereof, and the like.

In an embodiment, in response to detecting a cybersecurity threat, a mitigation is initiated in the computing environment where the workload is deployed.

Such a software wizard is advantageous as it increases the usability of a cybersecurity monitoring solution, and improves the incident response time. By improving the scenario selection, for example utilizing a large language model to map an incident input to a scenario, the improved software wizard decreases incidence response time, and therefore decreases time to mitigation in the event of a cybersecurity breach.

FIG. 1 is an example schematic diagram of a computing environment communicatively coupled with a cybersecurity inspection environment, utilized to describe an embodiment. A computing environment 110 is, according to an embodiment, a cloud computing environment, a networked environment, an on-premises environment, a combination thereof, and the like.

For example, in an embodiment, a cloud computing environment is implemented as a virtual private cloud (VPC), a virtual network (VNet), and the like, on a cloud computing infrastructure. A cloud computing infrastructure is, according to an embodiment, Amazon® Web Services (AWS), Google® Cloud Platform (GCP), Microsoft® Azure, and the like.

In certain embodiment, the computing environment 110 includes a plurality of entities. An entity in a computing environment 110 is, for example, a resource, a principal 118, and the like. A resource is, according to an embodiment, a hardware, a baremetal machine, a virtual machine, a virtual workload, a provisioned hardware (or portion thereof, such as a processor, a memory, a storage, etc.), and the like.

A principal 118 is an entity which is authorized to perform an action on a resource, initiate an action in the computing environment 110, initiate actions with respect to other principals, a combination thereof, and the like. According to an embodiment, a principal is a user account, a service account, a role, a combination thereof, and the like.

In certain embodiments, a resource in a computing environment is a virtual machine 112, a software container 114, a serverless function 116, and the like. For example, in an embodiment, a virtual machine 112 is implemented as an Oracle® VirtualBox®. In some embodiments, a software container 114 is implemented utilizing a Docker® Engine, a Kubernetes® platform, combinations thereof, and the like. In certain embodiments, a serverless function 116 is implemented in AWS utilizing Amazon Lambda®.

In some embodiments, the computing environment 110 is implemented as a cloud environment which includes multiple computing environments. For example, a first cloud computing environment is utilized as a production environment, a second cloud computing environment is utilized as a staging environment, a third cloud computing environment is utilized as a development environment, and so on. Each such environment includes, according to an embodiment, a resource, a principal, and the like, having a counterpart in the other environments.

For example, according to an embodiment, a first virtual machine 112 is deployed in a production environment, and a corresponding first virtual machine is deployed in a staging environment, which is essentially identical to the production environment.

In an embodiment, the computing environment 110 is monitored by an inspection environment 120. According to an embodiment, the inspection environment 120 is configured to inspect, scan, detect, and the like, cybersecurity threats, cybersecurity risks, cybersecurity objects, misconfigurations, vulnerabilities, exploitations, malware, combinations thereof, and the like.

In certain embodiments, the inspection environment 120 is further configured to provide a mitigation action, a remediation action, a forensic finding, a combination thereof, and the like.

In some embodiments, an inspector 122 is configured to detect a cybersecurity object in a workload deployed in the computing environment 110. For example, in an embodiment, the inspector is a software container pod configured to detect a predetermined cybersecurity object in a disk, access to which is provided to the inspector 122 by, for example, the inspection controller 124.

In an embodiment, a cybersecurity object is a password stored in cleartext, a password stored in plaintext, a hash, a certificate, a cryptographic key, a private key, a public key, a hash of a file, a signature of a file, a malware object, a code object, an application, an operating system, a combination thereof, and the like.

In certain embodiments, the inspector 122 is assigned to inspect a workload in the computing environment 110 by an inspection controller 124. In an embodiment, the inspection controller initiates inspection by, for example, generating an inspectable disk based on an original disk. In an embodiment, generating the inspectable disk include generating a copy, a clone, a snapshot, a combination thereof, and the like, of a disk of a workload deployed in the computing environment 110, and providing access to the inspectable disk (for example by assigning a persistent volume claim) to an inspector 122.

In an embodiment, where an inspector 122 detects a cybersecurity object in a disk of a workload, a representation is generated and stored in a security database 128. In certain embodiments, the database is a columnar database, a graph database, a structured database, an unstructured database, a combination thereof, and the like. In certain embodiments, the representation is generated based on a predefined data schema. For example, a first data schema is utilized to generate a representation of a resource, a second data schema is utilized to generate a representation of a principal, a third data schema is utilized to generated a representation of a cybersecurity object, etc.

For example, according to an embodiment, the representation is stored on a graph database, such as Neo4j®. In certain embodiments, a resource is represented by a resource node in the security graph, a principal is represented by a principal node in the security graph, etc.

In some embodiments, the inspection environment 120 further includes a natural language query processor 126 (NLQP 126). In an embodiment, the NLQP 126 is configured to receive a query in a natural language, and generate, based on the received query, a structured query which is executable on the database 128.

In certain embodiments, it is advantageous to provide a user with an interface to query the database 128 in a natural language. It is further advantageous to provide a system and method that provides accurate translation between a query received in natural language and a database query, in order to provide a user with a relevant result to their query.

Figure 2:
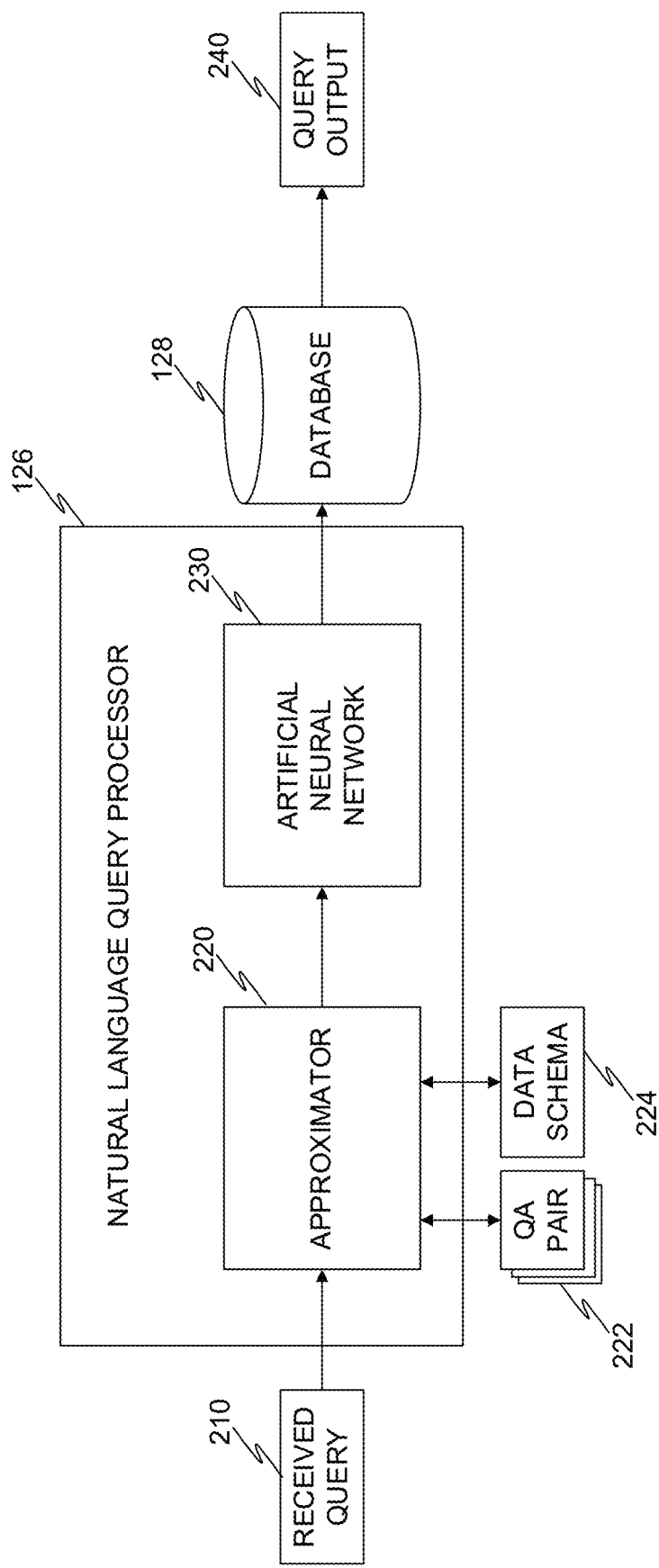
FIG. 2 is an example schematic illustration of a natural language query processor (NLQP), implemented in accordance with an embodiment.

FIG. 2 is an example schematic illustration of a natural language query processor, implemented in accordance with an embodiment. In certain embodiments, the natural language query processor 126 (NLQP 126) is implemented as a virtual workload in an inspection environment. In some embodiments, the NLQP 126 includes an approximator 220, and an artificial neural network (ANN) 230. In some embodiments, the ANN 230 is a large language model, such as GPT, BERT, and the like.

In an embodiment, the NLQP 126 receives a query 210. In some embodiments, the received query 210 is a query in natural language, such as an English language query. In an embodiment, the received query 210 cannot be executed on a database, such as security database 128. In certain embodiments, the security database 128 includes a representation of a computing environment, such as the computing environment 110 of FIG. 1 above.

In an embodiment, the received query 210 is provided to the approximator 220. In an embodiment, the approximator 220 includes a large language model (LLM), such as GPT, BERT, and the like.

In some embodiments, the LLM (e.g., of the approximator 220, the ANN 230, etc.) includes a fine-tuning mechanism. In an embodiment, fine-tuning allows to freeze some weights of a neural network while adapting others based on training data which is unique to a particular set of data.

In certain embodiments, an LLM cannot be fine-tuned, for example due to a lack of access to weights of the model. In such embodiments, it is advantageous to provide the LLM with additional data in order to generate a result which is accurate and relevant.

For example, in an embodiment, the approximator 220 is provided with a plurality of query-answer (QA) pairs 222, and a data schema 224. In an embodiment, the QA pairs 222 include each a database query and a corresponding response. In some embodiments, the query of the QA pair 222 is a query which was previously executed on the database 128.

In some embodiments, the data schema 224 is a data schema of the database 128. In some embodiments, a plurality of data schemas 224 are utilized. For example, in an embodiment, the plurality of data schemas 224 include a data schema for a principal, a data schema for a resource, a data schema of a cloud computing environment, combinations thereof, and the like.

In an embodiment, the approximator 220 is configured to generate a prompt based on a predetermined template, the received query 210, a QA pair 222, and the data schema 224. In some embodiments, the approximator is configured to receive the query 210 and generate a selection of a QA pair 222 from a plurality of QA pairs. For example, in an embodiment, the approximator is configured to receive the query 210, and generate a prompt for an LLM to detect from a plurality of QA pairs, a QA pair 222 which is the closest match to the received query 222. In some embodiments, the prompt further includes the data schema 224.

In an embodiment, the output of the approximator 220 is a QA pair 222 which an LLM of the approximator 220 outputs as being the closest match to the received query 210. In some embodiments, the approximator 220 outputs a group of QA pairs from the plurality of QA pairs.

In certain embodiments, the output of the approximator 220 is provided to the ANN 230. In an embodiment, the ANN 230 is configured to generate a database query (i.e., a query which is executable by a database, database management system, etc.) based on the output of the approximator 220. In some embodiments, the ANN 230 includes an LLM, and is configured to generate a prompt for the LLM based on the received output, the received query 210, and the data schema 224.

For example, in an embodiment, the ANN 230 is configured to receive the query 210, a QA pair 222 selected by the approximator 220, and the data schema 224 as inputs. The ANN 230 is further configured to generate a prompt for an LLM based on the received inputs, which, according to an embodiment, configures the LLM to output a database query based on the received inputs.

In an embodiment, the outputted database query is executed on a database 128 to provide a query output 240. In an embodiment, a plurality of database queries are outputted by the NLQP 126, each of which is executed on a database, such as database 128. In such embodiments, a plurality of query outputs 240 are generated.

In some embodiments, the query output 240 is provided to a client device, a user account, a user interface, rendered for display on a graphical user interface, a combination thereof, and the like.

Figure 3:
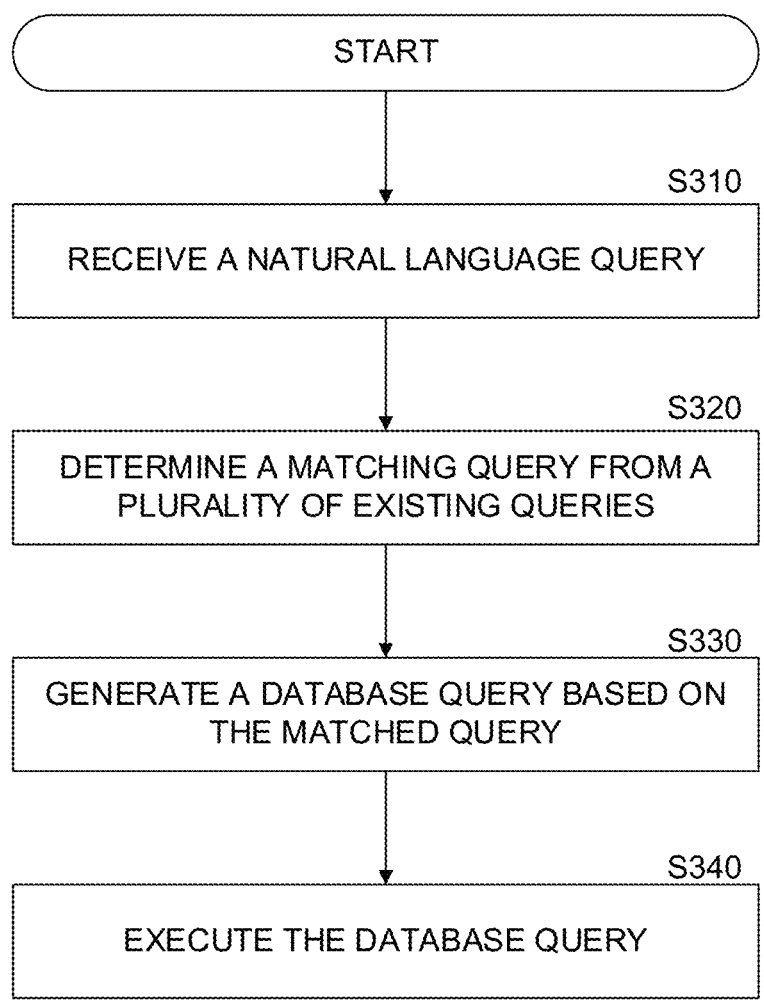
FIG. 3 is an example flowchart of a method for generating a database query based on a natural language query, implemented in accordance with an embodiment.

FIG. 3 is an example flowchart of a method for generating a database query based on a natural language query, implemented in accordance with an embodiment. In an embodiment, the method is performed by utilizing an artificial neural network.

At S310, a natural language query is received. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "public ECRs with container images that contain cloud keys", "find all vulnerabilities that can be exploited remotely", "find all vulnerabilities that lead to information disclosure".

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilites (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S320, an existing query is selected. In an embodiment, the existing query is an existing database query. In some embodiments, the selection includes a query pair, including a database query and a response, result, and the like, which is generated based on execution of the database query on a database.

In an embodiment, the existing query is selected from a group of preselected queries. In some embodiments, a match is determined between the natural language query and a plurality of existing queries. In certain embodiments, generating a match includes determining a match score. For example, in an embodiment, a match score is generated between a natural language query and a preexisting database query based on natural language processing (NLP) techniques, such as the distance-based Word2Vec.

For example, in an embodiment, a distance is determined between the received natural language query and a first preexisting database query, and between the received natural language query and a second preexisting database query. In certain embodiments, the preexisting query having a shorter distance to the natural language query is selected as the matched query.

At S330, a database query is generated. In an embodiment, the database query is generated based on the received natural language query and the selected existing query. In certain embodiments, the database query is generated by adapting the existing query to the received natural language query. In an embodiment, adapting the existing query based on the received natural language query is performed by an artificial neural network, such as a generative ANN. In some embodiments, the adaptation is performed by a generative adversarial network (GAN), which includes a generator network and a discriminator network.

At S340, the database query is executed. In an embodiment, executing a database query includes configuring a database management system to receive a database query, execute the database query on one or more datasets stored in the database, and generate a result.

In certain embodiments, where a plurality of database queries are generated, each query is executed on a database. According to an embodiment, each query is executed on the same database, a different database, a combination thereof, and the like.

Figure 4:
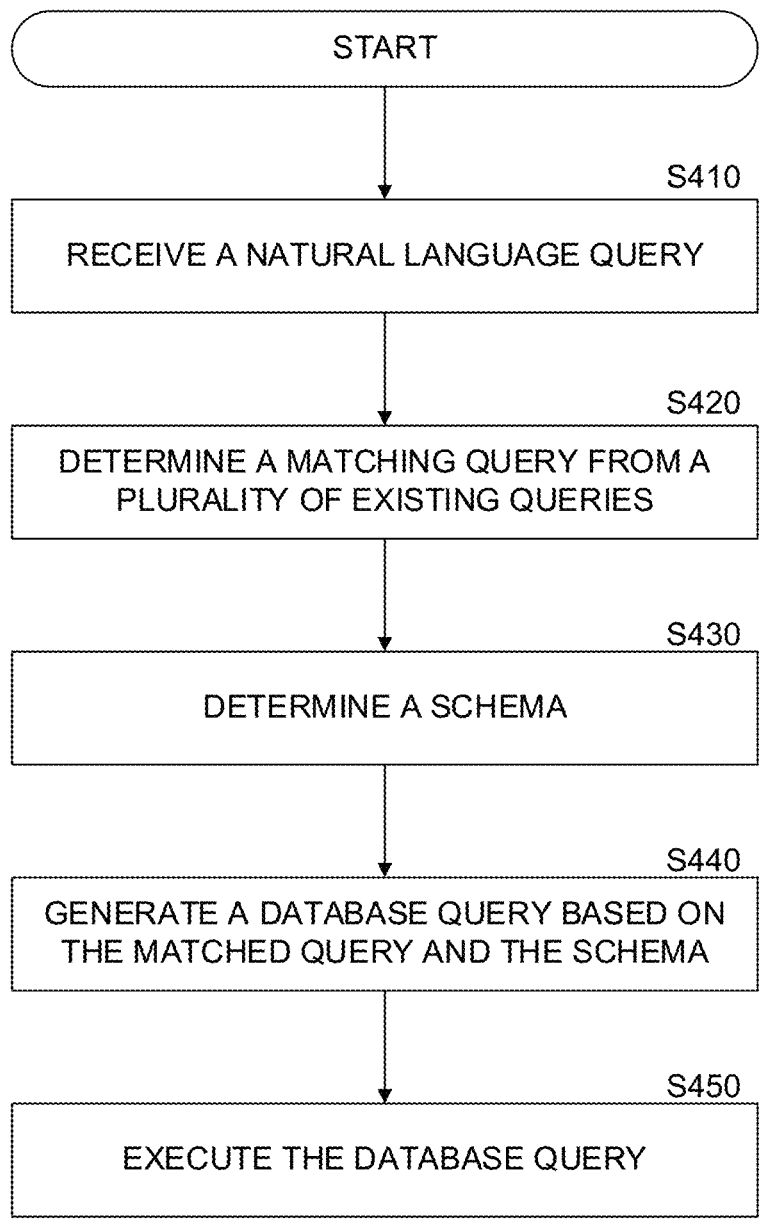
FIG. 4 is an example flowchart of a method for generating a database query based on a natural language query utilizing a large language model, implemented in accordance with an embodiment.

FIG. 4 is an example flowchart of a method for generating a database query based on a natural language query utilizing a large language model, implemented in accordance with an embodiment. In an embodiment, the method is performed by utilizing an artificial neural network such as an LLM. For example, an LLM is, according to an embodiment, GPT, BERT, and the like.

At S410, a natural language query is processed. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "public ECRs with container images that contain cloud keys", "find all vulnerabilities that can be exploited remotely", "find all vulnerabilities that lead to information disclosure".

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilites (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S420, an existing query is selected. In an embodiment, the existing query is an existing database query. In some embodiments, the selection includes a query pair, including a database query and a response, result, and the like, which is generated based on execution of the database query on a database.

In an embodiment, the existing query is selected from a group of preselected queries. In an embodiment, an LLM is provided with a generated prompt to select a query from the group of preselected queries. In certain embodiments, the prompt is generated based on a preexisting template. For example, in an embodiment, the prompt is generated based on a template, the received query, a data schema, a combination thereof, and the like. In some embodiments, the LLM is configured to select a database query from the preselected queries which mostly resembles the natural language query.

At S430, a data schema is determined. In certain embodiments a plurality of data schemas are determined. In an embodiment, the data schema is determined based on the natural language query. For example, in an embodiment, a keyword, a phrase, and the like, are detected in the natural language query.

In some embodiments, the natural language query is received as a text input which is parsed, and a keyword is detected in the parsed text. In an embodiment, the keyword, phrase, and the like, is matched to a data schema.

For example, in the natural language query "public ECRs with container images that contain cloud keys", the keyword "container" corresponds to a data schema of a resource, and the keyword "cloud keys" corresponds to a data schema of an identity.

At S440, a database query is generated. In an embodiment, the database query is generated based on the received natural language query and the selected existing query. In certain embodiments, the database query is generated by adapting the existing query to the received natural language query.

In an embodiment, the database query is generated as an output of an LLM. For example, according to an embodiment, an LLM is configured to receive a prompt, which is generated based on a template. In an embodiment, the template is adapted to the prompt based on the received natural language query, the selected database query, the determined schema, a combination thereof, and the like.

At S450, the database query is executed. In an embodiment, executing a database query includes configuring a database management system to receive a database query, execute the database query on one or more datasets stored in the database, and generate a result.

In certain embodiments, where a plurality of database queries are generated, each query is executed on a database. According to an embodiment, each query is executed on the same database, a different database, a combination thereof, and the like.

For example, in an embodiment, a database query is executed on a graph database, such as Neo4j®, which includes, stored thereon, a representation of a computing environment. In an embodiment, the representation is generated based on a data schema, a unified data schema, a data template, a combination thereof, and the like.

According to an embodiment, a unified data schema is a data schema which is utilized across a plurality of workloads, across a plurality of computing environments, combinations thereof, and the like. For example, according to an embodiment, a unified data schema for workloads is utilized to represent different resources, such as a virtual machine, a software container, a serverless function, and the like. In some embodiment, a unified data schema utilizes the same data fields to represent a virtual machine in a first computing environment (e.g., AWS), a virtual machine in a second computing environment (e.g., GCP), a software container in the first computing environment, a software container in the second computing environment, and so on.

Figure 5:
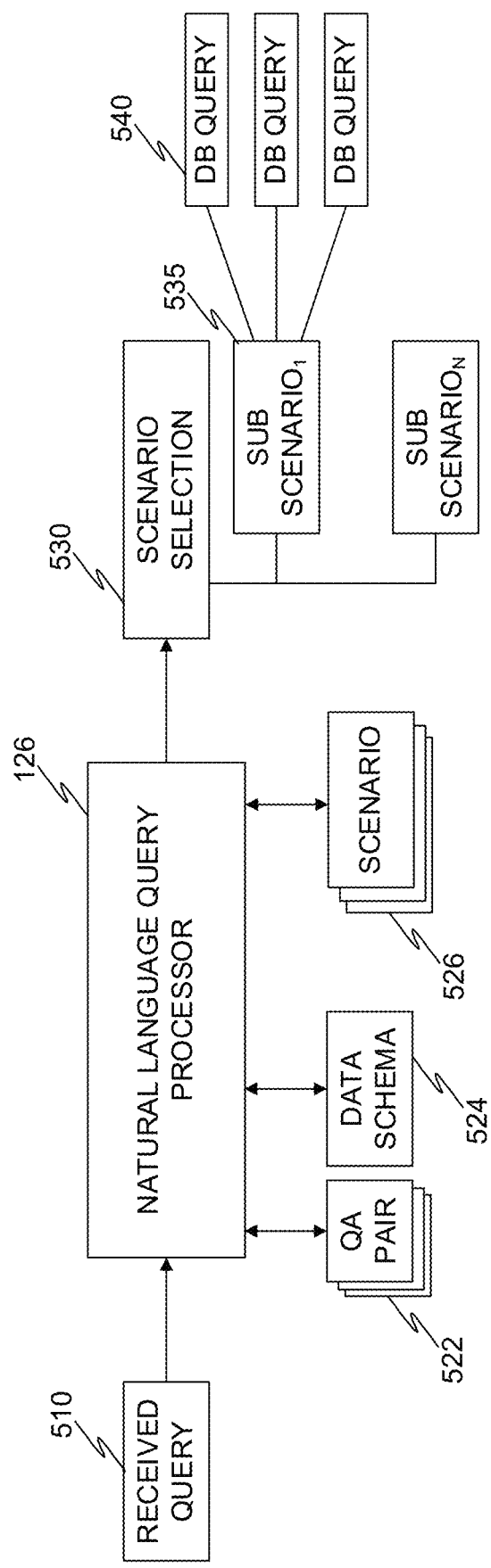
FIG. 5 is an example schematic illustration of a natural language query processor utilized in providing a cybersecurity incidence response system, implemented in accordance with an embodiment.

FIG. 5 is an example schematic illustration of a natural language query processor utilized in providing a cybersecurity incidence response software wizard, implemented in accordance with an embodiment.

According to an embodiment, an incident input 510 is received by the natural language query processor (NLQP) 126. In an embodiment, the incident input 510 includes an alert, a natura language query, a combination thereof, and the like.

In an embodiment, the NLQP 126 is configured to access a plurality of query-answer pairs 522, a data schema 524, and a plurality of scenarios 526. In some embodiments, the query-answer pairs 522 includes a plurality of database queries and a corresponding answer, result, and the like, generated by executing the database query on a database.

In an embodiment, the data schema 524 includes a plurality of data fields, each data field for storing a value corresponding to the data field. For example, in an embodiment, the data schema 524 is a unified data schema, which is utilized in generating a representation of a computing environment, such as a cloud computing environment. In some embodiments, the data schema 524 includes a template for representing a resource, a principal, a cloud entity, and the like. For example, according to an embodiment, a unified data schema includes a template for representing a workload, wherein the workload is a virtual machine, a software container, a serverless function, and the like.

According to an embodiment, the NLQP 126 is configured to receive the input 510 and select a scenario of the plurality of scenarios 526. For example, in an embodiment, the NLQP 126 is configured to receive the incident input 510 and generate a prompt (e.g., based on a predefined template) for a large language model (LLM), such that the prompt, when executed by the LLM, configures the LLM to select a scenario from the plurality of scenarios 526. In an embodiment, the selected scenario is a scenario which most likely corresponds to the received incident input 510. A scenario may be, for example "A workload is infected with malware", according to an embodiment. In an embodiment, the prompt is further generated based on the data schema 524, the plurality of query-answer pairs 522, a combination thereof, and the like.

In some embodiments, the NLQP 126 is configured to generate a scenario for the plurality of scenarios 526. In certain embodiments, the NLQP 126 is configured to receive an incident input 510 and generate a scenario based thereon. For example, in an embodiment, the NLQP 126 is configured to receive the incident input 510 and generate a prompt (e.g., based on a template) that when executed by the LLM, configures the LLM to generate a scenario. In some embodiments, the plurality of scenarios 526 includes a group of predefined scenarios. In an embodiment, the prompt is further generated based on the data schema 524, the plurality of query-answer pairs 522, a combination thereof, and the like.

In an embodiment, each scenario includes a plurality of sub-scenario. A sub-scenario includes, according to an embodiment, a query, a natural language query, a database query, combinations thereof, and the like. In some embodiments, a sub-scenario corresponds to a plurality of queries, natural language queries, database queries, combinations thereof, and the like.

In certain embodiments, a sub-scenario is selected. In some embodiments, a plurality of sub-scenarios are selected. In an embodiment, the NLQP 126 is configured to receive a scenario selection 520, and generate a prompt for an LLM, which when executed by the LLM, configured the LLM to select a sub-scenario. In an embodiment, the prompt is further generated based on the data schema 524, the plurality of query-answer pairs 522, a combination thereof, and the like.

In an embodiment, a sub-scenario 535 corresponds to a plurality of database queries, such as database query 540. In certain embodiments, a software wizard is configured to generate a graphical user interface (GUI) for rendering on a display of a user device (e.g., a personal computer, a tablet, a smartphone, a desktop computer, a wearable device, a combination thereof, and the like). In some embodiments, the GUI includes an input for receiving a user input. For example, in an embodiment, a group of the plurality of scenarios are each rendered on the GUI, and a user input is received. In an embodiment, the received user input corresponds to a selection of a scenario of the group of scenarios, wherein the group of scenarios is selected by the NLQP 126 as having the best correlation to the incident input 510.

In some embodiments, the GUI further includes a group of sub-scenarios of the plurality of sub-scenarios, and a received user input corresponds to a selection of a sub-scenario of the group of sub-scenarios, wherein the group of sub-scenarios is selected by the NLQP 126 as having the best correlation to the incident input 510.

Figure 6:
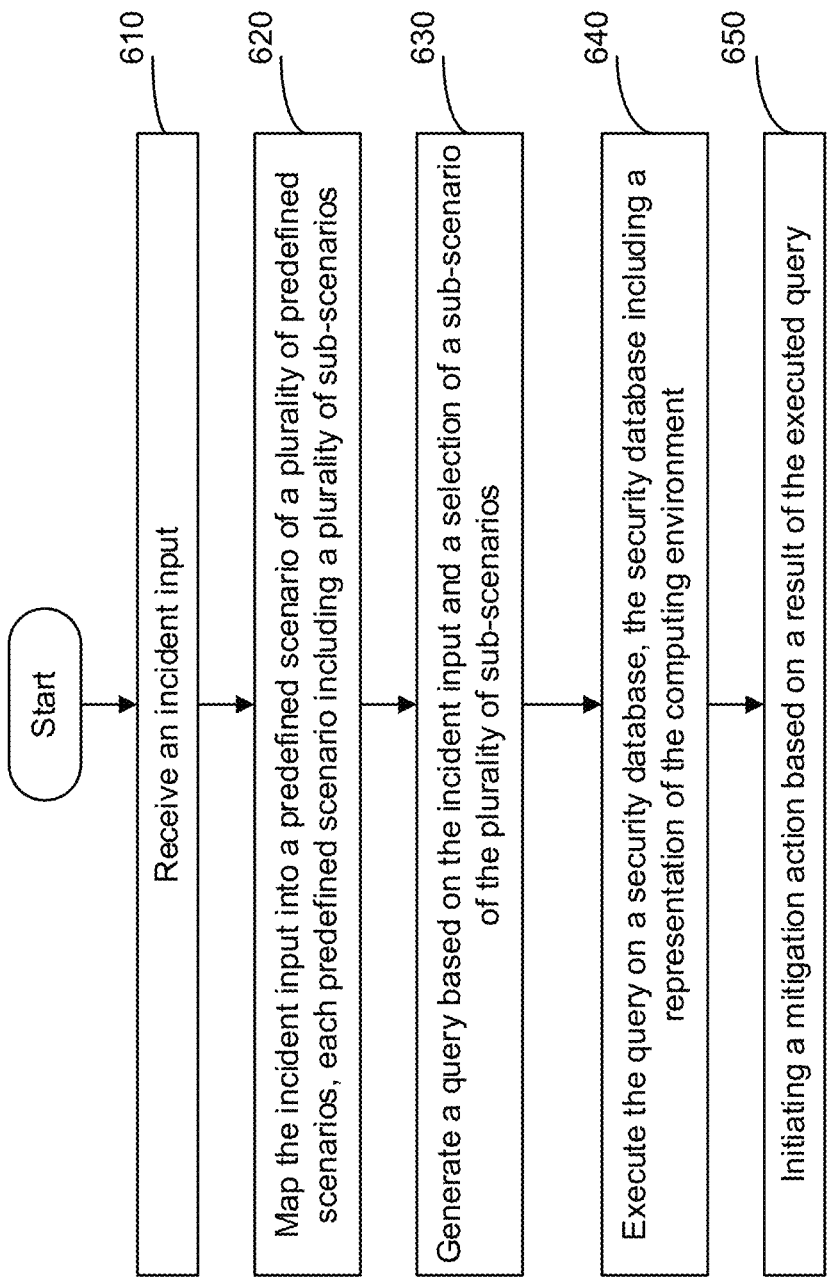
FIG. 6 is an example flowchart of a method for initiating an incident response mitigation action, implemented in accordance with an embodiment.

FIG. 6 is an example flowchart of a method for initiating an incident response mitigation action, implemented in accordance with an embodiment.

At S610, an incident input is processed. In an embodiment, the incident response is received. In some embodiments, the incident response includes an alert, a query, a natural language query, a database query, a combination thereof, and the like.

For example, in an embodiment, an alert is "EC2 virtual machine with ID of i-012abcd34efghi56 infected with malware with SHA1 hash of 3395856ce81f2b7382dee72602f798b642f14141", which indicates that a virtual machine having an identifier of "i-012abcd34efghi56" is infected with a malware corresponding to a hash "3395856ce81f2b7382dee72602f798b642f14141".

At S620, the incident input is mapped to a scenario. In an embodiment, the incident input is provided to a natural language query processor (NLQP) which is configured to generate a prompt for an LLM based on the incident input. In some embodiments, the prompt is generated based on a template, for example a predefined template.

In certain embodiments, the prompt is further generated based on a data schema, a plurality of query-answer pairs, a combination thereof, and the like. In an embodiment, the prompt, when processed by an LLM, configures the LLM to select a scenario from a plurality of scenarios.

In some embodiments, the plurality of scenarios incudes predefined scenarios, scenarios generated by an LLM (the LLM configured to generate a scenario based on an incident input, a data schema, a combination thereof, and the like), a combination thereof, and the like.

In an embodiment, a data schema includes a plurality of data fields, integrity constraints, and the like, which are utilized to represent a computing environment. For example, in an embodiment, a representation of a computing environment is stored in a database (e.g., a graph database) based on the data schema. In some embodiments, the data schema is a unified data schema, based on which a plurality of different types of computing environments (e.g., cloud computing environments, hybrid computing environments, AWS, Azure, GCP, etc.) are represented. In some embodiments, the unified data schema is utilized to represent a plurality of different types of entities, such as resources, principals, workloads, virtual machines, software containers, serverless functions, combinations thereof, and the like.

At S630, a database query is generated. In an embodiment, the database query is generated based on a selection of a scenario, a sub-scenario, a data schema, an incident input, a combination thereof, and the like. For example, in an embodiment, the database query is generated by providing a prompt to a large language model. A large language model is, for example, GPT, BERT, and the like.

In certain embodiments, the prompt is generated based on a template. In some embodiments, the template is modified based on a selection of a scenario, a sub-scenario, a data schema, an incident input, a combination thereof, and the like.

In an embodiment, the database query is generated based on a predefined database query. In some embodiments, the database query is generated based on the predefined database query, modified by, for example, the incident input. In an embodiment, an incident input is parsed to detect values (e.g., an identifier of a resource, an identifier of a cloud computing environment, an identifier of a cybersecurity object, an identifier of a cybersecurity threat, a combination thereof, and the like.

At S640, the database query is executed. In an embodiment, executing the database query produces a database answer, a database result, and the like. In an embodiment, the database result includes a textual result. For example, in an embodiment, the textual result includes an identifier of a resource, an identifier of a workload, an identifier of a principal, a cybersecurity object, a representation of a mitigation action, a combination thereof, and the like.

In some embodiments, the database query is executed on a graph database having stored thereon a security graph, the security graph including a representation of a computing environment, such as a cloud computing environment. In an embodiment, representation is generated based on the data schema. For example, in some embodiments, a resource, such as a workload, virtual machine, software container, serverless function, and the like, is represented by a node. In an embodiment, the node representing the resource is connected to other nodes representing resources, such as software applications, appliances, operating systems, etc.

In an embodiment, the security graph further includes representations of cybersecurity objects, representations of cybersecurity threats, remediation actions, mitigation actions, combinations thereof, and the like. For example, in an embodiment, a node representing a resource is connected to a node representing a cybersecurity threat, such as a malware, where a malware object was detected on the resource, for example by inspection. In some embodiments, a node representing a remediation action is connected to a node representing the cybersecurity threat to which the remediation action corresponds. In certain embodiments, a remediation action, a mitigation action, and the like, are represented as: metadata on a node representing a resource, metadata on a node representing a cybersecurity risk, metadata on a node representing a cybersecurity object, a combination thereof, and the like.

For example, according to an embodiment, a malware object is remediated by an action which includes sandboxing the infected application, revoking access to a workload, revoking access from a workload, a combination thereof, and the like.

At S650, a mitigation action is initiated. In an embodiment, a mitigation action includes generating a notification, generating an alert, updating an alert, generating a severity score, updating a severity score, generating a ticket, generating a risk score, updating a risk score, initiating a remediation action, initiating an incident response, a combination thereof, and the like.

In an embodiment, a remediation action includes revoking access to a resource, revoking access from a resource, revoking a permission from a principal, revoking access to a principal, uninstalling an application, sandboxing an application, sandboxing a workload, a combination thereof, and the like. In an embodiment, revoking access includes revoking network access to a resource, from a resource, etc. In some embodiments, revoking access to a principal includes removing a permission from a first principal to assume another principal. For example, in an embodiment, a first service account is revoked permission to assume a role of a second service account.

In certain embodiments, the result of executing the database query at S640 is provided to an LLM with a modified prompt. In an embodiment, the prompt is modified based on the result of the database query execution. In some embodiments, the prompt includes a predefined template. In certain embodiments, the predefined template includes data fields which are modified based on the result. In an embodiment, the prompt, when processed by the LLM, configures the LLM to output an explanation for the result.

For example, in an embodiment, the prompt is generated based on a template such as "how did RESOURCE_ID become infected with MALWARE_ID". In an embodiment, the data field of "RESOURCE_ID" is modified with a value received as a result of executing the database query, and MALWARE_ID is a data field which is modified based on the incident input. In some embodiments, a plurality of data fields (e.g., both RESOURCE_ID AND MALWARE_ID), are modified based on the incident input.

Figure 7:
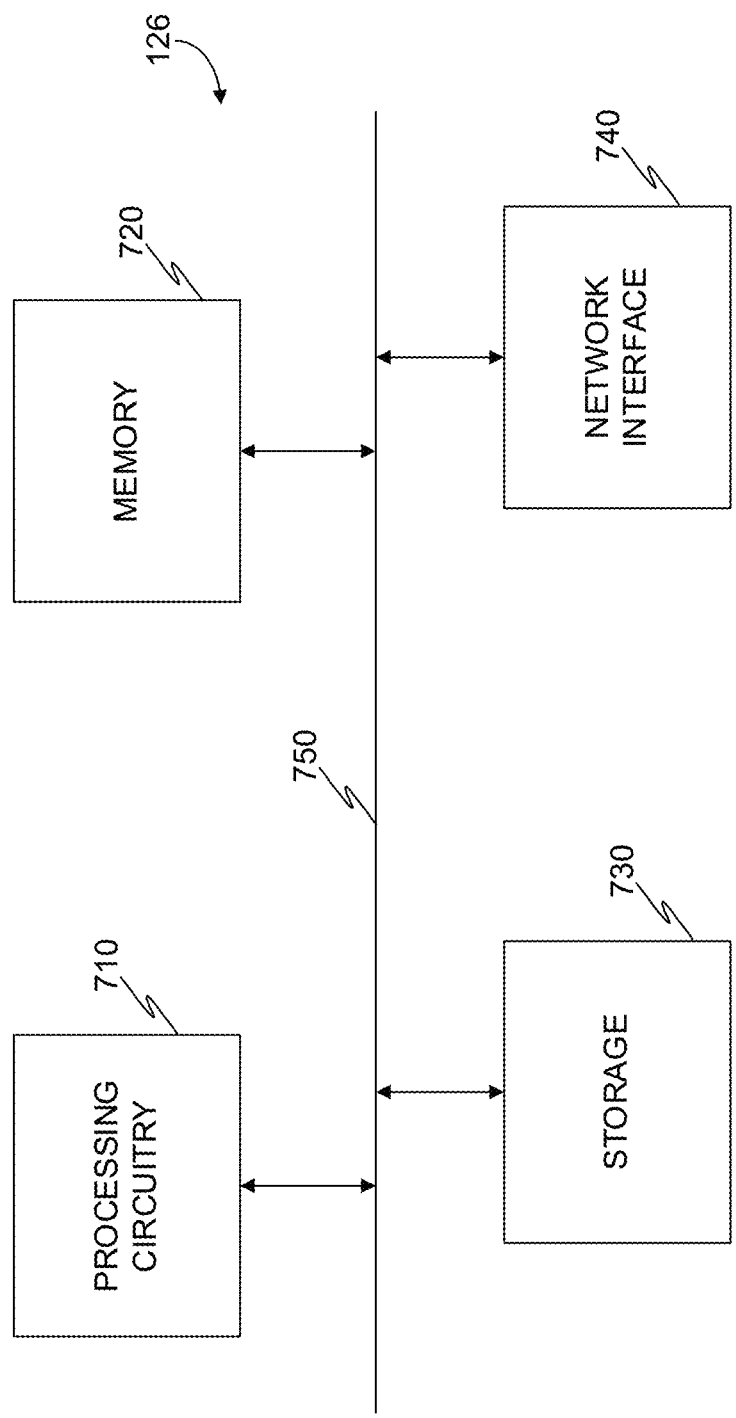
FIG. 7 is an example schematic diagram of an NLQP according to an embodiment.

FIG. 7 is an example schematic diagram of an NLQP 126 according to an embodiment. The NLQP 126 includes a processing circuitry 710 coupled to a memory 720, a storage 730, and a network interface 740. In an embodiment, the components of the NLQP 126 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the NLQP 126 with communication with, for example, the security database 128, an inspector 122, an inspection controller 124, and the like.

It should be understood that the embodiments described herein are not limited to the specific architecture illustrated in FIG. 7, and other architectures may be equally used without departing from the scope of the disclosed embodiments.

Furthermore, in certain embodiments the [other system] may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing cybersecurity incident response, comprising:
    receiving an incident input based on an event in a computing environment;
    generating a prompt for a large language model (LLM) based on the received incident input;
    utilizing the LLM to generate an output based on the generated prompt;
    utilizing the LLM to map the received incident input into a scenario of a plurality of scenarios based on the output of the LLM, wherein each scenario is associated with an incidence response;
    generating a query based on the received incident input and the mapped scenario;
    executing the query on a security database, the security database including a representation of the computing environment; and
    initiating a mitigation action based on a result of the executed query.

2. The method of claim 1, further comprising:
    detecting an identifier of a resource in the result of the executed query; and
    initiating the mitigation action on the resource.

3. The method of claim 1, further comprising:
    detecting an identifier of a cybersecurity threat in the result of the executed query, the cybersecurity threat represented by a representation in the security database; and
    detecting in the security database a representation of a remediation action connected to the representation of the cybersecurity threat.

4. The method of claim 3, further comprising:
    initiating the remediation action in the computing environment.

5. The method of claim 1, wherein the mitigation action includes any one of: generating a notification, generating an alert, updating an alert, generating a severity score, updating a severity score, generating a ticket, generating a risk score, updating a risk score, initiating a remediation action, initiating an incident response, and any combination thereof.

6. The method of claim 1, wherein the incident input includes any one of: a query, a statement, and a combination thereof.

7. The method of claim 1, further comprising:
    training the LLM on any one of: a data schema utilized in representing the computing environment, an incident data classified to a scenario, the plurality of scenarios, and any combination thereof.

8. The method of claim 7, wherein generating the query further comprises:
    generating a second prompt based on any one of: the received incident input, the data schema, the plurality of scenarios, and a combination thereof; and
    utilizing the LLM with the second prompt to output the query.

9. The method of claim 7, further comprising:
    training the LLM further on a plurality of database queries, each database query executable on the security database.

10. A non-transitory computer-readable medium storing a set of instructions for providing cybersecurity incident response, the set of instructions comprising:
    one or more instructions that, when executed by one or more processors of a device, cause the device to:
        receive an incident input based on an event in a computing environment;
        generate a prompt for a large language model (LLM) based on the received incident input;
        utilize the LLM to generate an output based on the generated prompt;
        utilize the LLM to map the received incident input into a scenario of a plurality of scenarios based on the output of the LLM, wherein each scenario is associated with an incidence response;
        generate a query based on the received incident input and the mapped scenario;
        execute the query on a security database, the security database including a representation of the computing environment; and
        initiate a mitigation action based on a result of the executed query.

11. A system for providing cybersecurity incident response comprising:
    a processing circuitry;
    a memory, the memory containing instructions that, when executed by the processing circuitry, configure the system to:
    receive an incident input based on an event in a computing environment;
    generate a prompt for a large language model (LLM) based on the received incident input;
    utilize the LLM to generate an output based on the generated prompt;
    utilize the LLM to map the received incident input into a scenario of a plurality of scenarios based on the output of the LLM, wherein each scenario is associated with an incidence response;
    generate a query based on the received incident input and the mapped scenario;

execute the query on a security database, the security database including a representation of the computing environment; and initiate a mitigation action based on a result of the executed query.

12. The system of claim 11, wherein the memory contains further instructions which when executed by the processing circuitry further configure the system to:

detect an identifier of a resource in the result of the executed query; and initiate the mitigation action on the resource.

13. The system of claim 11, wherein the memory contains further instructions which when executed by the processing circuitry further configure the system to:

detect an identifier of a cybersecurity threat in the result of the executed query, the cybersecurity threat represented by a representation in the security database; and detect in the security database a representation of a remediation action connected to the representation of the cybersecurity threat.

14. The system of claim 13, wherein the memory contains further instructions which when executed by the processing circuitry further configure the system to:

initiate the remediation action in the computing environment.

15. The system of claim 11, wherein the mitigation action includes any one of:

generating a notification, generating an alert, updating an alert, generating a severity score, updating a severity score, generating a ticket, generating a risk score, updating a risk score, initiating a remediation action, initiating an incident response, and any combination thereof.

16. The system of claim 11, wherein the incident input includes any one of:

a query, a statement, and a combination thereof.

17. The system of claim 11, wherein the memory contains further instructions which when executed by the processing circuitry further configure the system to:

train the LLM on any one of:

a data schema utilized in representing the computing environment, an incident data classified to a scenario, the plurality of scenarios, and any combination thereof.

18. The system of claim 17, wherein the memory contains further instructions that, when executed by the processing circuitry for generating the query, further configure the system to:

generate a second prompt based on any one of:

the received incident input, the data schema, the plurality of scenarios, and a combination thereof; and utilize the LLM with the second prompt to output the query.

19. The system of claim 17, wherein the memory contains further instructions which when executed by the processing circuitry further configure the system to:

train the LLM further on a plurality of database queries, each database query executable on the security database.

* * * * *